Dec. 15, 1942.  A. G. BODINE, JR  2,304,793
METHOD OF AND APPARATUS FOR CUTTING PIPE
Filed June 9, 1941  3 Sheets-Sheet 2

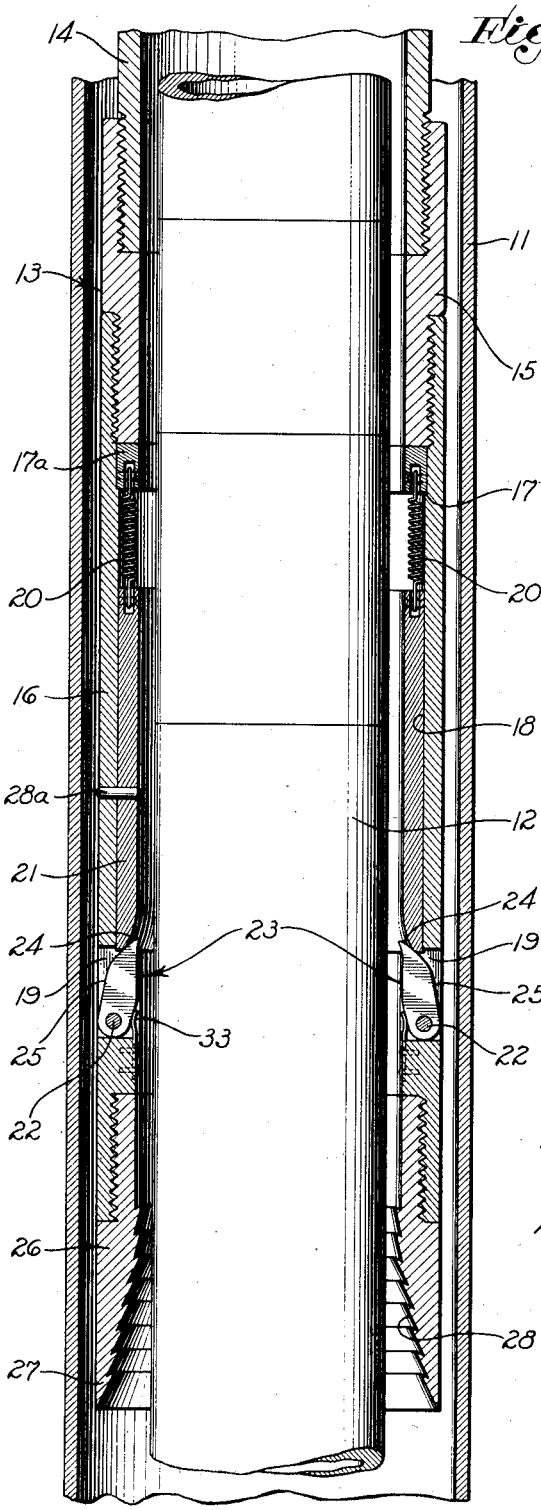
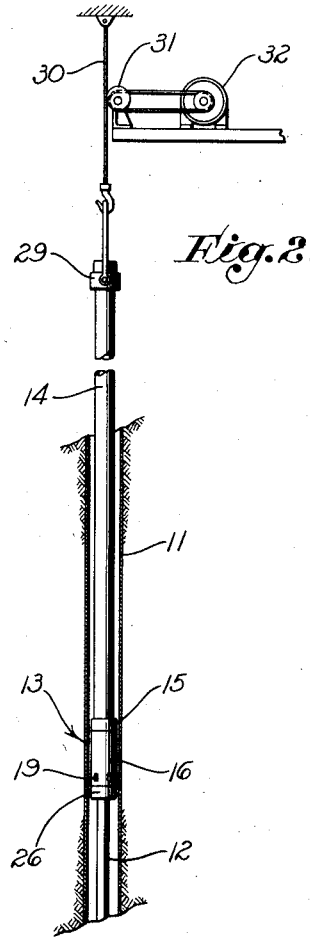
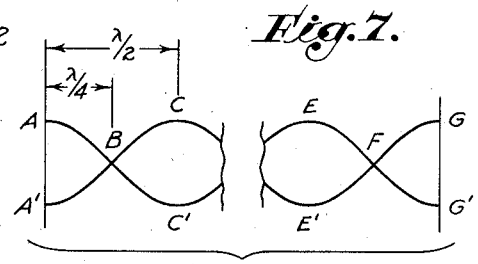

INVENTOR
ALBERT G. BODINE, JR.
BY HARRIS, KIECH, FOSTER & HARRIS

FOR THE FIRM
ATTORNEYS

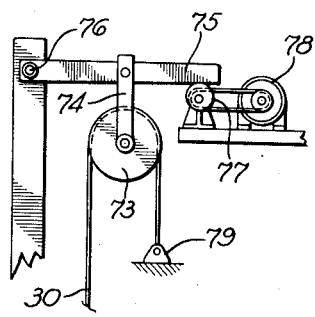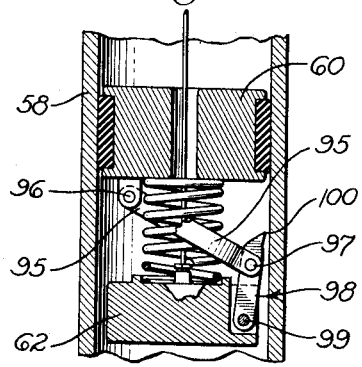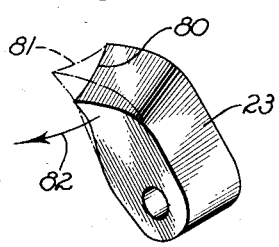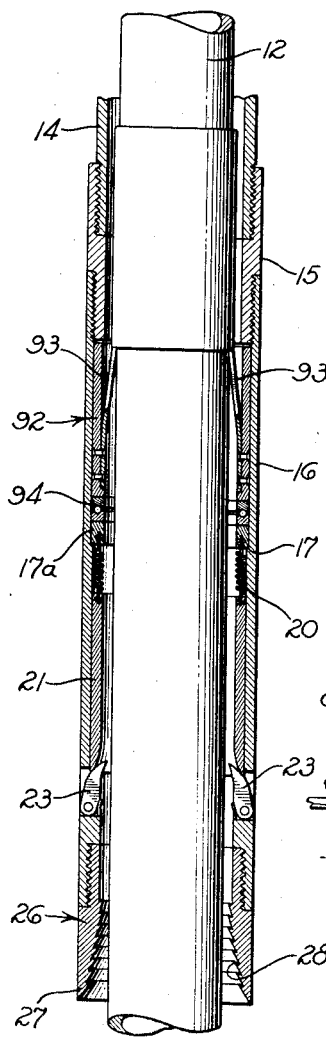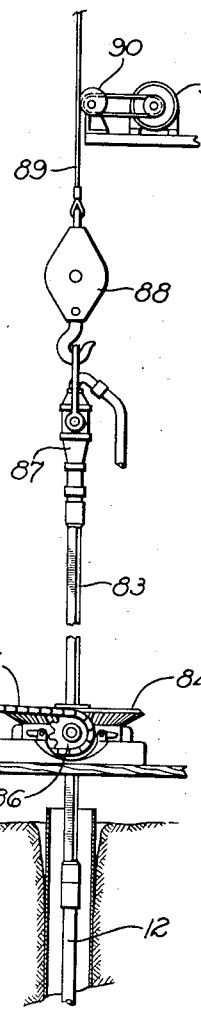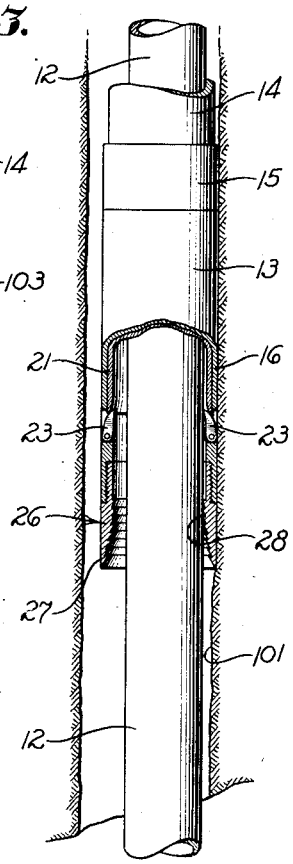

Patented Dec. 15, 1942

2,304,793

UNITED STATES PATENT OFFICE 2,304,793

METHOD OF AND APPARATUS FOR CUTTING PIPE

Albert G. Bodine, Jr., Burbank, Calif., assignor to The Calpat Corporation, Los Angeles, Calif., a corporation of California Application June 9, 1941, Serial No. 397,252

35 Claims. (Cl. 164—0.6)

My invention relates to a method of and apparatus for cutting pipe, such as drill pipe, tubing, and casing employed in the oil well art.

The objects of my invention include the provision of a method of and apparatus for perforating, slotting, and ripping drill pipe, tubing, and casing, all of which are referred to generally herein as pipe, and cutting off the pipe preparatory to its removal from the well, utilizing as a source of energy sound waves, preferably of a frequency within the audible range. My invention also provides a method of and apparatus for subjecting pipe in a well to a jarring or percussion action tending to loosen it from its contact with the formation or other pipe with which it may be frozen, to permit its removal from the well, utilizing energy transmitted by sound waves.

Other objects of my invention include the perforating, slotting, ripping, and cutting off of pipe or the like by the planing or scraping or percussion action of cutter elements upon the pipe in which the circumferential and radial oscillation of the cutter elements is in response to sound waves and, alternatively, in which the radial oscillation of the cutter elements is in response to sound waves and the circumferential rotation of the cutter elements relative to the pipe being cut is in response to torque applied to them through the tubing connecting them to the surface of the ground.

Still another object of my invention is the provision of a method of and apparatus for subjecting a pipe in a well to percussion blows tending to move the pipe upwardly in the well and a cutting action tending to pierce or sever the pipe in the well and for applying such cutting action only when the pipe cannot be moved upwardly in the well in response to such blows.

During the transmission of sound waves through an elastic medium, the movement of the particles of the medium is local, comprising small to-and-fro excursions in the medium in the direction of transmission of the sound wave which may be similiar in character to the oscillation of the sound wave generating device. My invention contemplates the amplification of such movement of the particles at the desired location in the medium, so that their movement is greater than the movement of the sound generating device. This is accomplished in accordance with my invention by establishing within the transmitting medium a resonant condition in which a large portion of the energy generated is stored in the medium by the reflection of the sound waves in a manner to reinforce those originating with the generator, and thus establish within the medium a standing or stationary wave. Such a standing wave has considerably larger amplitude than the single sound waves transmitted, so that its wave fronts are very steep, and the velocity and acceleration of the particles of the wave-transmitting medium at the maximum velocity variation zones are very great, and the rate of change of pressure or tension within the wave-transmitting medium at the pressure variation zones is greatly enhanced.

Embodiments of my invention capable of accomplishing the objects and providing the advantages herein stated and others are described in the following specification, which may be better understood by reference to the accompanying drawings in which Fig. 1 is a vertical elevational view of an embodiment of the apparatus of my invention positioned in an oil well;

Fig. 2 is an elevational view of such embodiment, illustrating the method of suspending it in the well;

Fig. 7 is a diagrammatic view of a stationary sound wave in the sound-transmitting medium;

Fig. 8 is a fragmentary elevational view of a form of sound wave generating means;

Fig. 9 is a vertical sectional view of a modified cutter actuating mechanism;

Fig. 10 is a vertical sectional view illustrating an embodiment of the tool of my invention utilizing an over-shot for engaging the pipe;

Fig. 11 is an elevational view of an embodiment of my invention for use with a rotary table for rotating the drill pipe;

Fig. 12 is a vertical elevational view partially sectioned illustrating the engagement of the grabs or cutters of the tool of my invention with the drill pipe to loosen or jar it;

Fig. 13 is a vertical elevational view illustrating a drill pipe bent or twisted into contact with the wall of the well; and Fig. 14 is a perspective view of a modified form of cutter element of the tool of my invention.

Figure 3:
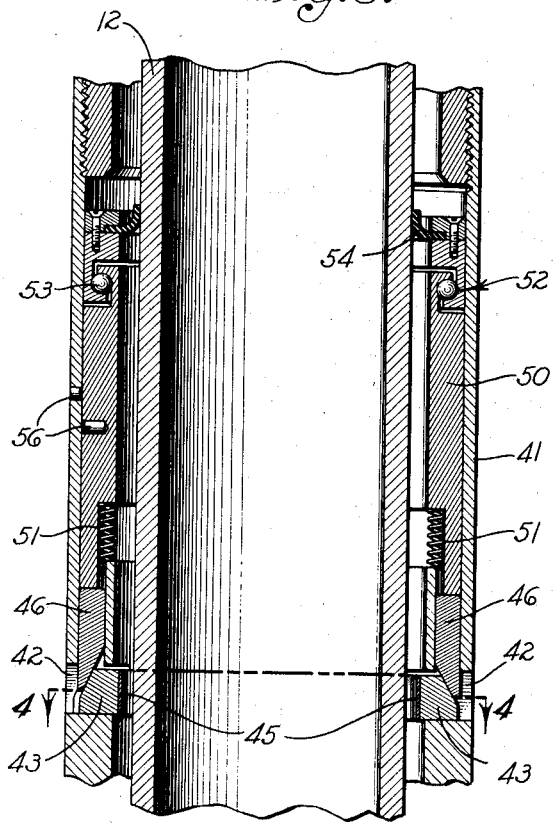
Fig. 3 is a fragmentary vertical sectional view of another embodiment of my invention.

Referring to the drawings, which are for illustrative purposes only, the numeral 11 indicates a well casing in an oil well having therein a string of drill pipe 12 which is stuck or frozen within the casing 11 or the formation therebeneath and which it is desired to remove from the casing 11. A tool embodying my invention and capable of accomplishing such removal is indicated by the numeral 13 and is connected through a coupling 15 to a string of tubing 14 by which it is lowered into the well. The tool 13 includes a tubular tool body 16 secured to the coupling 15. The tubular tool body 16 includes an annular shoulder 17, upon which rests a ring 17a, an annular recessed portion 18 therebeneath, and a plurality of radial openings 19 therein below the annular recessed portion 18. Tension springs 20 are positioned within the annular recessed portion 18 with their upper ends connected to the ring 17a and their lower ends connected to an inertia member or sleeve 21 of substantial weight. The resistance to deformation of the tension springs 20 is so related to the weight of the inertia sleeve 21 that the inertia sleeve 21 is supported with its lower end adjacent the upper edge of the radial openings 19 of the tubular body 16 when the tool is stationary.

Secured in the vertical walls of each of the radial openings 19 is a pivot pin 22 extending across such radial opening near its lower end, and rotatably mounted on each of the pivot pins 22 is a cutter 23. Each cutter 23 is provided with a cutting edge 24 at its inner end and a cam surface 25 along its outer side for engagement with the inertia member 21. The cutters 23 are mounted so that they may be rotated or oscillated between the position illustrated in Fig. 1, in which they are substantially vertical with their cutting edges 24 adjacent the inner surface of the inertia sleeve 21, to substantially horizontal position, in which they are prevented from further downward rotation by engagement with the lower walls of the radial openings 19. Below the radial openings 19 the tubular body 16 may be connected to a chisel member 26 having at its lower end a pointed shoe portion 27 and having on its inner surface a plurality of upwardly directed grabs or cutters 28.

Fig. 2 illustrates a means of generating sound waves for transmission through the string of tubing 14 to the tool 13. The tubing string 14 is suspended by a swivel 29 from a cable 30 subjected to transverse impacts by an eccentric 31 rotated by a motor 32. The laterally directed impacts upon the cable 30 cause variations in its effective length, oscillating the tubing string 14 vertically in the well. As the upper end of the tubing string 14 is moved upwardly, a tension or rarefaction impulse is transmitted through the tubing string 14 to the tool 13, and, as the upper end of the tubing string 14 moves downwardly, a compression impulse of like value is, in a like manner, transmitted through the tubing string 14. Due to the fact that the upper end of the tubing string 14 is subjected to simple harmonic motion, these sound waves or tension and compression impulses transmitted through the tubing string 14 are sine waves.

In lieu of the apparatus shown for generating sound waves in the tubing string 14, the cable 30, as illustrated in Fig. 8, may be passed over and suspended upon a pulley 73 rotatably supported on a hanger 74 mounted upon a lever 75 pivoted at 76 at one end with its other end resting upon and reciprocated by an eccentric 77 driven by a suitable motor 78. The end of the cable 30 being anchored at 79 and the eccentric 77 being rotated, the cable 30 and the upper end of the tubing string 14 are subjected to simple harmonic motion, causing tension and compression impulses in the form of sine waves to be transmitted through the tubing string 14.

When it is desired to cut the drill pipe 12, the tool 13 is lowered over the upper end of the drill pipe 12, and, during this lowering, the drill pipe may be washed around by passing washing liquid or rotary drilling mud downwardly in the tubing string 14 around the drill pipe 12 to facilitate the lowering of the tool 13. If no obstacle to the lowering of the tool 13 is encountered before the tool has reached the level at which it is desired to cut the drill pipe 12, the lowering of the tool is terminated at such level, and sound waves are transmitted to it through the tubing string 14. Springs 33 may be provided resiliently urging the cutters 23 to their vertical positions, illustrated in Fig. 1, out of contact with the drill pipe 12 during the descent of the tool.

The frequency with which the impulses are imparted to the tubing string 14 is determined by the amplitude desired and the conditions of resonance in the tubing string 14. It is desirable that the frequency be low to minimize the damping effect of the tubing string 14 and to insure substantial amplitude for the transmitted waves. The frequency is preferably below 1,000 pulsations per second for the cutting operation, though under some conditions the frequency may be greater. The amplitude or longitudinal oscillation of the tool 13 will vary inversely with the frequency for the same energy in-put and may with advantage be of the order of from 12 inches when the frequency is of the order of 50 pulsations per second to one-half inch when the frequency is of the order of 1,000 pulsations per second.

For the cutting action hereinafter described I prefer that the amplitude be of the order of one inch or more. If a condition of resonance is established within the tubing string 14, the amplitude of movement of the tool 13 may be equal to, or less than, or greater than the amplitude of movement of the upper end of the tubing string 14, depending upon the degree of resonance and the amount of damping.

Resonance is easily established, inasmuch as the sound waves are transmitted through like materials in the tubing string 14, the tool 13, and the drill pipe 12 therebeneath.

Referring to Fig. 7 of the drawings, I have illustrated diagrammatically a standing wave between the generating device at AA' and the tool at GG' if the tool is being employed for a cutting operation, or between the generating device at AA' and the level of the drill pipe at which it is frozen in the well at GG' if the tool is being employed for a jarring or loosening action. When a tension or compression impulse is transmitted through the elastic medium from the impulse generator at AA', it is reflected from the level at which the drill pipe is frozen in the well as a like impulse if the tool is being employed as a jarring tool, and it is reflected from the region of the tool if the tool is being used as a cutting tool as an unlike impulse due to the fact that this region represents a "free end" in an acoustic system.

In order, therefore, to establish resonance within the transmitting medium so that each reflected impulse reinforces a generated impulse being directly transmitted through the reinforcing medium, it is necessary, if the tool is being employed as a jarring device, only to adjust the frequency of the generated impulse until the distance between the generating device and the point in the drill pipe at which it is frozen is equal to a multiple of a half wave length of the transmitted impulse.

Similarly, if it is desired to establish a condition of resonance within the elastic medium when the tool is being employed as a cutting device, it is necessary only to adjust the frequency of the generated impulse so that the distance between the generating device and the tool 13 is equal to an odd multiple of a fourth of the wave length of the generated impulse.

With the frequency so adjusted and the locus GG' of Fig. 7 representing the point in the drill pipe at which it is frozen, it will be seen that a compression or tension impulse generated at AA' will be reflected as a like impulse at GG' and returned to the point of generation at AA' at exactly that moment when a like impulse is again generated at AA', where it is reflected as a like impulse reinforcing the impulse then generated.

Likewise, when the device is being employed as a cutting tool, if the point F of Fig. 7 be regarded as the location of the cutting tool 13, it will be seen that a tension impulse being reflected therefrom as a compression impulse reaches AA' at exactly that moment that a compression impulse is being generated at AA' and is reflected at AA' as a compression impulse reinforcing that compression impulse then being generated.

In both uses of the tool it is apparent, therefore, that a condition of resonance of the sound waves may readily be established, so that a standing or stationary sound wave is formed in the elastic transmitting medium.

Referring to Fig. 7, it will be seen that such a standing wave causes a retention in the transmitting medium of zones of maximum pressure variation and minimum velocity variation of the particles of the transmitting medium, which zones are represented at AA', CC', EE', and GG', alternating with zones of maximum velocity variation and minimum pressure variation of such particles, which latter zones are indicated at B and F of Fig. 7.

The tool being located at a zone of maximum velocity variation and minimum pressure variation in the standing wave causes the pivotal connection of the cutters 23 to the tubular body 16 to be oscillated vertically a distance equal to the amplitude of the standing wave. The spring 20 acting as a continuation of the tubing string 14 of a length equal to a fourth of the wave length of the transmitted sound wave, the inertia sleeve 21 occupies a position in the standing wave corresponding to a zone of maximum pressure variation and minimum velocity variation. Thus relative vertical movement of the cutters 23 and the inertia sleeve 21 and the elastic or transmitting medium adjacent thereto which acts as an inertia means is accomplished at the desired frequency, which may be very great, and this relative movement causes the cutters 23 to exert a cutting action upon the drill pipe 12.

If the tubing string 14 is not rotated, but is held stationary, it will be seeen that the drill pipe 12 is subjected to percussion blows and vertical cutting action by the cutters 23 at a number of spots in its circumference corresponding to the number of cutters in the tool, a number of times per second corresponding to the frequency of the sound waves transmitted and with a force of impact governed by the rate of supply of energy to the suspending cable 30, the inertia of the inertia member 21, and the velocity and acceleration of the annular shoulder 17 and the pivot pins 22 of the tool body 16, which latter is dependent upon the degree of resonance established in the tubing string 14. The length of the upward movement of the cutting elements 23, while in contact with the pipe 12, is dependent upon the amplitude of movement of the pivot pins 22 of the tubular body 16, which is governed by the amplitude of movement of the upper end of the tubing string 14, the degree of resonance established in the tubing string 14, and the amount of damping of the transmitted sound waves. The cutters 23 are so shaped that in their upward movement in contact with the drill pipe 12, they subject the drill pipe to a planing action. On the downward movement of the cutters 23 relative to the drill pipe 12, they are relieved of the pressure of the inertia member 21 and thus exert no pressure against the drill pipe 12. During such downward movement, the cutters may drag along the surface of the pipe 12 which they have planed or may be positively retracted therefrom as by the springs 33, so that their action is in all respects similar to a conventional planing action.

If it is desired to cut long slots or perforations in the drill pipe 12, the tool 13 may be raised and lowered during this percussion cutting operation, and the transmission of the sound waves through the tubing string 14 continued until the slots or perforations are completed. If it is desired to cut off the drill pipe 12, the tool 13 may be very slowly rotated, so that the loci of the percussion impacts of the cutters 23 surround the drill pipe 12, the percussion operation being continued until the drill pipe is severed, at which time the severed portion may be elevated to the surface of the ground supported upon the upper surfaces of the cutters 23 which are retained in an inwardly directed horizontal position by their engagement with the lower walls of the radial openings 19 of the tubular body 16.

If desired, an overshot 92 having arms or dogs 93 adapted to engage a tool joint or coupling may be supported upon a rotary bearing 94 between the coupling 15 and the ring 17a in the tubular body 16 of the tool 13, as illustrated in Fig. 10, to remove the cut off portion of the drill pipe.

To eliminate the possibility of the cutters 23 piercing the drill pipe 12 and thereby resisting rotation relative to the drill pipe before the drill pipe is severed, the cutting edges 24 may be made of substantial circumferential dimensions or tapered relative to the circumference of the drill pipe 12, and they may, if desired, be made of such number or with such an aggregate circumferential dimension of the cutting edges 24 as to substantially sever the drill pipe without relative rotation of the cutter 23 and the drill pipe. Likewise, if it is desired, a plurality of openings may be formed by the cutters 23 at one level in the drill pipe 12, and other sets of circumferentially spaced openings may be formed at different and adjacent levels in the drill pipe 12 until the drill pipe 12 may be subjected to tension pulling it apart at such openings.

The apparatus and method of my invention finds utility when applied to the old practice of performing a cutting off operation by rotating the tool mechanically, as by rotating the upper end of the tubing string 14 by attaching it to a kelly 83, square in cross section, suspended by a swivel 87 from a travelling block 88 and slidably extending through a square opening in a rotary table 84 or the like driven by a chain 85 and sprocket 86 and conventional rotary table gears at the surface of the ground (see Fig. 11). If the tubing string 14 be rotated in such a manner and subjected to tension and compression impulses as by contacting a supporting cable 89 attached to the travelling block 88 with an eccentric 90 driven by a motor 91, as hereinbefore described and as illustrated in Fig. 11, the cutters 23 exert a cutting action circumferentially upon the drill pipe 12 being held thereagainst by the pressure of the inertia sleeve 21, and this circumferential cutting action is enhanced by periodic percussion blows in response to the sound waves transmitted to the tool 13 during its rotation. In order to provide for a minimum effective pressure of the desired value upon the cutters 23 urging them into contact with the drill pipe 12 at all stages of their rotation, the force of the spring 20 may be so related to the weight of the inertia sleeve 21 that, when the tool 13 is stationary, the inertia sleeve 21 rests upon and subjects the cutters 23 to a force of desired value.

If desired, a shear pin 28a may be provided, extending through the tubular body 16 and the inertia sleeve 21 and holding the latter above the cutters 23 until the tool has been lowered to the desired level at which time a rapid up-and-down movement of the tool 13 may be caused to shear the pin 28, permitting the inertia sleeve 21 to assume a somewhat lower position subjecting the cutters 23 to a force urging them inwardly as above described. Thereafter when the tool 13 is rotated and the tubing string 14 is subjected to sound waves, the pressure of contact of the cutting edges 24 of the cutters 23 against the drill pipe 12, and hence their cutting action thereon, will vary in response to the sound waves, giving a cutting action due to the combined effects of rotative planing and percussion.

For such type of operation the cutting edge 80 of each of the cutters 23 may be declined from the horizontal, as indicated by the broken lines 81 of Fig. 14, in the direction of rotation, as shown by the arrow 82 of the same figure, so that the planing action hereinbefore described occurs circumferentially as well as vertically, or the cutting edges may be so shaped as to subject the pipe to an abrading action by rotation in contact therewith.

It frequently occurs that the tool 13 reaches an obstacle within the casing before it has been lowered to the desired level. This may be due to the drill pipe 12 being curved toward or into tight engagement with the inner surface of the casing 11 or the wall 101 of the well, as illustrated in Fig. 12, or to the deposition of cuttings or metal particles between the drill pipe 12 and the casing 11 freezing the drill pipe in place or to engagement with the formation below the lower end of the casing 11. As the shoe 27 strikes such an obstacle and is rotated in contact therewith, it tends to free the drill pipe 12 of the obstruction and to center it in the casing 11 at the level of the chisel member 26. If the drill pipe 12 is curved relative to the wall 101 of the well as illustrated in Fig. 13 the drill pipe is forced into tight pressural contact with the wall 101 at points 103 and 104. The chisel member 26 being driven between the engaging or adjacent drill pipe and wall of the well at 103 as illustrated in Fig. 12, the grabs or cutters 28 in one side of the chisel member 26 engage a portion of the periphery of the drill pipe, so that when the tubing string 14 is subjected to sound waves, as hereinbefore described, the grabs or cutters 28 are caused to reciprocate vertically relative to the casing 11. The amplitude of this reciprocation and the force with which the grabs 28 are moved upwardly is dependent upon the conditions hereinbefore set forth, which may be controlled so that the amplitude is from a fraction of one inch to several inches and the force exerted very substantial.

If, in response to such force, the drill pipe 12 can be moved upwardly, it will be noted that the upward movement is accomplished in a step-by-step manner. Thus the grabs 28, by contact with a portion of the periphery of the drill pipe 12, moves the drill pipe upwardly during the upward movement of the tool 13. The frequency of the sound waves is made such that a condition of resonance is established within the tubing string 14 and that portion of the drill pipe 12 between its engagement with the grabs 28 and the locus of the obstruction to its vertical movement.

Preferably the frequency of the impulses generated and transmitted during the jarring action is higher than the frequency employed for the cutting operation and is of an order corresponding to the self-resonance of the portion of the drill pipe between the tood 13 and the level at which the drill pipe is frozen in the well. Frequencies of the order of 1,000 to 10,000 impulses per second are well adapted for this purpose. A resonant condition within the transmitting medium is easily accomplished by variation in the frequency of the generated and transmitted impulses until there is an absence of audible beats.

With such a resonant condition the upward movement of the fish or engaged portion of the drill pipe may be many times greater than the amplitude of movement of the upper end of the tubing string 14. During the downward movement of the chisel member 26, the grabs 28, because their cutting or engaging edges are directed upwardly, slide downwardly relative to the drill pipe 12 to a lower level where they engage a portion of the periphery of the drill pipe 12 to elevate it another step.

As the drill pipe 12 is thus elevated with a step-by-step motion, the cutters 23 do not move upwardly relative to the drill pipe 12, so that, although they are urged into sudden contact with the drill pipe 12 by the inertia sleeve 21 during each upward movement of the tool 13, they do not exert thereon any planing action, but serve merely to grab the drill pipe 12 and assist in its upward movement. Therefore, as long as the drill pipe 12 is moved upwardly in response to the operation of the tool, it is not cut. When, however, the resistance to upward motion of the drill pipe 12 is such that the grabs 28 engaging its periphery slide relative thereto, the cutters 23 likewise move vertically relative to the drill pipe 12, subjecting it to a planing action tending to sever it. It will thus be seen that the tool 13 operates to automatically change from an operation elevating the drill pipe 12, as long as this operation is possible, to an operation severing the drill pipe when it is no longer possible to elevate it.

During the elevation of the drill pipe as previously described, the engagement of the grabs 28 with a portion of the periphery of the drill pipe 12 during each upward movement of the chisel member 26 subjects the drill pipe 12 beneath this member to periodic tension impulses. These impulses and the compression impulses following them are in the form of sine waves. The action is therefore much superior to the ordinary jarring action upon stuck drill pipe, which comprises subjecting the drill pipe to stretch and suddenly releasing this tension to permit the string above the drill pipe to contract to subject the stuck drill pipe to a sudden impact generating a tension wave therein, which tension wave is of transient form. In this conventional jarring action, therefore, the drill pipe and the string upon which the jar is suspended are subjected to tension and compression waves which are transient. Since the energy which can be transmitted as either a compression wave or a tension wave without destructively distorting the string or drill pipe is enormously greater if it is transmitted in the form of a sine wave than if it is transmitted in the form of a transient wave, it will be seen that the method and apparatus of my invention permits the safe application of much more energy to the stuck drill pipe to accomplish its removal than the conventional form of jarring action heretofore employed.

Furthermore, the jarring action provided by the tool of my invention is superior to that obtainable with the conventional jarring device heretofore employed, in that the sound waves are transmitted through the drill pipe to a point at which it is frozen in the well in such a manner that the drill pipe at such point is located at a zone of maximum pressure variation within the standing sound wave, so that the maximum force tending to free the drill pipe is applied at the exact point where such force is needed. Also, the entire length of the drill pipe from the tool 13 to the point at which it is frozen in the well is vibrated in a manner tending to free it from the obstruction. Such effects are not accomplished by applying a transient tension or compression impulse to the upper end of the drill pipe because of the elasticity of the drill pipe.

If it is desired to employ the tool 13 to perforate, slot, rip, or sever pipe within which the tool 13 is placed, it is necessary only to so mount the cutters 23 and the inertia sleeve 21 that the cutters 23 are swung outwardly of the tubular body 16 instead of inwardly, as hereinbefore described. Likewise, if it is desired to form a single perforation or slot in the drill pipe 12 or to rip it, a single cutter 23 may be employed instead of the plurality of cutters described.

Figure 5:
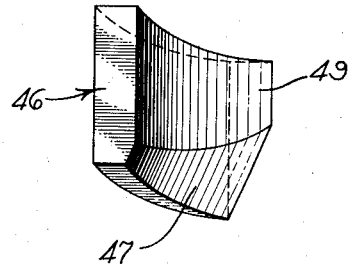
Fig. 5 is a perspective view of one of the wedge members included in the embodiment shown in Figs. 3 and 4.
Figure 4:
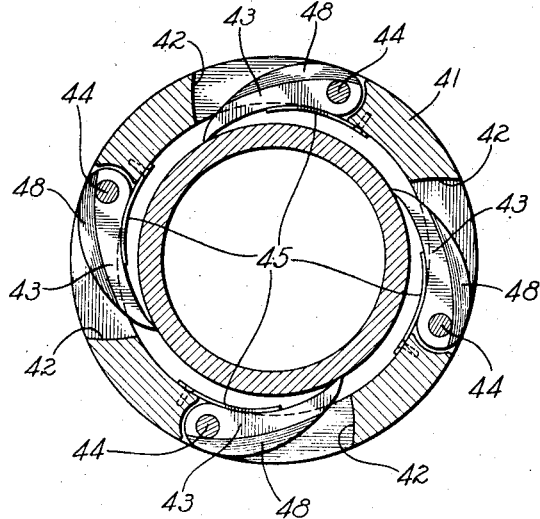
Fig. 4 is a sectional view taken as indicated by the line 4—4 of Fig. 3.

Another embodiment of my invention adapted for perforating, slotting, and ripping pipe and severing it preliminary to its removal from the well is illustrated in Figs. 3, 4, and 5. This embodiment includes a tubular body 41 having therein cutter slots 42 in which cutters 43 are swingably mounted on vertical pivot pins 44 secured to the tubular body 41. In this embodiment the cutters 43 swing horizontally and are resiliently urged to their retracted or inoperative position by springs 45 secured to the tubular body 41. Mounted for vertical movement in ways in the tubular body 41 are wedges 46. As illustrated in Fig. 5, each of the wedges 46 is curved in cross section corresponding to the curvature of the tubular body 41 and is provided with a lower cam surface 47 declining from the horizontal circumferentially of the tool body 41 and diminishing in thickness in the direction of its declination, so that its lowermost and narrowest portion first engages a complementary cam surface 48 provided upon the top of the associated cutter 43, and its inner wall 49 progressively engages the outer circumferential wall of the associated cutter 43 as the cutter moves inwardly during the severing operation.

An inertia member 50 is mounted for reciprocation within the tubular body 41 and for contact with the wedges 46 to urge them downwardly and move the cutters 43 inwardly against the drill pipe 12. The inertia member 50 is supported by one or more springs 51, acting against the body 41, and is secured to a pressure-responsive yoke 52 including an anti-friction bearing 53 and an inwardly extending flexible packing collar 54 adapted for engagement with the drill pipe 12 sealing the space between the drill pipe and the interior of the tubular body 41.

The space between the drill pipe 12 and the tubing string 14 being filled with a suitable liquid, sound waves are transmitted through the liquid column to the pressure-responsive yoke 52, the frequency being adjusted so that a standing sound wave is established in the transmitting medium, as previously described, and the inertia member 50 is positioned at a zone of maximum velocity variation in such a standing wave. When the inertia member 50 moves downwardly in response to the sound waves transmitted through the liquid column, its cam surface 47 and inner wall 49 engage the cam surface 48 and outer circumferential wall of the cutters 43, respectively, urging the cutters 43 inwardly into cutting engagement with the drill pipe 12. If the tubular body 41 is not rotated, this cutting is performed by percussion action, so that the drill pipe 12 is pierced in a number of places corresponding to the number of cutters 43.

If desired, the tubular body 41 may be intermittently or continuously rotated so that the cutting action is extended around the periphery of the drill pipe 12. The force of the springs 51 may be so adjusted relative to the inertia member 50 and to the pressure of the fluid column that, when the tool has reached the desired location in the well and a shear pin 56 extending through the tubular body 41 into the inertia member 50 is broken, as previously described, the inertia member 50 continuously exerts upon the wedges 46 a pressure urging the cutters 43 inwardly into cutting engagement with the drill pipe 12 to be cut. If the tool be continuously rotated, the cutters 43 perform a continuous cutting action upon the drill pipe 12 in response to pressure varying in intensity in accordance with the sound waves transmitted.

If the tubular body 41 be not rotated, but be oscillated vertically in the well during the transmission of the sound waves to the inertia member 50, vertical slots or perforations may be cut into the drill pipe 12. The embodiment of my invention illustrated in Figs. 3 to 5, inclusive, may readily be altered to provide a cutting device for a pipe outside of the tubular body 41 by mounting the cutters 43 for outward horizontal movement and forming the wedges 46 in such a manner as to force the cutters 43 outwardly in response to sound waves transmitted thereto.

Figure 6:
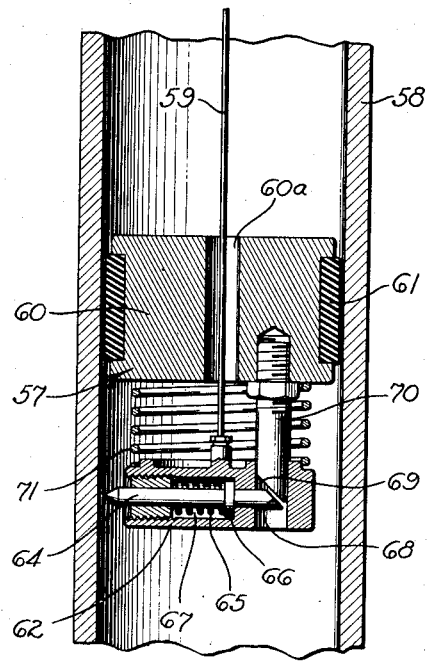
Fig. 6 is a vertical sectional view of another embodiment of my invention.

In Fig. 6 is illustrated another embodiment of my invention in which the numeral 57 indicates a tool suspended in a pipe or casing 58 on a cable or wire 59 extending to the surface of the ground. The tool 57 includes a weight member 60 having a central opening 60a therein through which the wire 59 freely passes. A protective layer 61 of neoprene or the like may be secured to the periphery of the weight member 60 to prevent wear on the casing 58 by contact with the weight member 60. Secured to the lower end of the wire 59 is a yoke 62 having horizontally slidable therein a cutter 64 resiliently retained in inoperative position by a spring 65 engaging a collar 66 on the cutter 64 and the wall of a cavity 67 in the yoke 62. The inner end of the cutter 64 is provided with a cam surface 68 adapted for engagement with a complementary cam surface 69 of an extension 70 of the weight member 60. The weight member 60 is supported upon the yoke 62 by a coil spring 71.

The spring 71 acts purely as a capacitance, and the condensation or compression impulses and tension or rarefaction impulses transmitted through it are reflected by the weight member 60 as like impulses, the spring 71 representing in effect a continuation of the cable 59 of a length equal to one-fourth a wave length of the impulses in the cable. Under conditions of resonance, therefore, the weight member 60 may be caused to occupy a zone of maximum pressure variation and minimum or low velocity variation, and the yoke 62 will occupy a zone of minimum pressure variation or maximum velocity variation, so that it reciprocates vertically relative to the weight member 60. During such reciprocation, the cam surface 69 of the extension 70 engages the cam surface 68 of the cutter 64, urging it outwardly into cutting engagement with the drill pipe 12.

The velocity and acceleration of the upward and radially outward movement of the cutter 64 may be made extremely great under conditions of resonance, since the standing wave transmitted is made extremely steep, and a very rapid cutting action is therefore secured. The spring 66, urging the cutter to retracted position, permits the tool to be withdrawn from the well, if for any reason it is desired to do so, before the cut is completed, as do the springs similarly associated with the cutter elements of the embodiments previously discussed.

With the tool illustrated in Fig. 6 it is possible to make a slot or perforation of any desired length within the casing 58. If it is desired to simultaneously pierce the casing 58 in a plurality of circumferentially spaced locations, a plurality of cutters 64 is provided in the yoke 62 actuated by a single cam faced extension or a plurality of such extensions carried by the weight member 60. Likewise, if it is desired to perforate, slot, or cut a pipe or casing from the outside, the weight member 60 may be made annular in form to surround this casing or pipe, and the yoke may likewise be made annular in form and provided with inwardly extensible cutters.

There may be substituted for the extension 70 with its cam surface 69 and the cam surface 68 upon the cutter 64 a linkage or toggle mechanism causing the cutter to move between operative and inoperative position in response to relative vertical movement of the cutter supporting yoke 62 and the weight member 60. An example of such a mechanism is shown in Fig. 9, in which the numeral 95 indicates a pair of links pivoted at 96 to the weight member 60 and pivoted at 97 to a cutter 98 intermediate its ends. The cutter 98 is pivoted at 99 to the cutter supporting yoke 62 for vertical swinging movement, so that as the yoke 62 and weight member 60 approach each other, the cuter 98 is swung outwardly with its cutting edge 100 striking the pipe or casing 58.

From the foregoing it will be seen that my invention provides a method of and apparatus for perforating, slotting, and ripping drill pipe, tubing, casing, and the like and cutting it off in a well preparatory to its removal therefrom, utilizing sound waves transmitted either through a string of tubing or the like, a column of liquid, or a cable, or wire, and that my invention provides means for providing the cutters either inside or outside of the pipe to be cut.

It will now be apparent also that my invention provides a method of and apparatus for accomplishing a cutting of the pipe or other article or object by a planing action, or a scraping abrasive action, or a percussion action, or a combination of such actions.

From the description of the embodiment illustrated in Figs. 1 and 2, it is obvious that the apparatus and method of my invention is capable of subjecting a pipe in a well to percussion blows tending to move it upwardly and subjecting the drill pipe to a cutting action tending to pierce or sever it and automatically changing from such a percussion action tending to free the drill pipe to such a cutting action tending to sever it only when the pipe cannot be moved upwardly in the well in response to the percussion blows.

It will now be understood also that my invention provides an extremely effective method of quickly and efficiently subjecting the drill pipe to a jarring action of great magnitude, utilizing energy in a form having the minimum of destructive effect to the drill pipe, and an apparatus simple and inexpensive in construction and efficient, positive, and rapid in operation.

While those embodiments of my invention illustrated and described are capable of performing the objects and providing the advantages primarily stated, there are various alterations thereof not limited to those suggested herein and various other embodiments likewise capable of performing these objects and providing these advantages, and my invention is therefore to be understood as not restricted to those forms hereinbefore described for illustrative purposes, but as including all of the variations and modifications thereof coming within the scope of the claims which follow.

I claim as my invention:

1. The method of cutting pipe utilizing a plurality of circumferentially spaced cutters, which includes the steps of: positioning the cutters adjacent the pipe; and subjecting the pipe to percussion blows of said cutters in response to sound waves.

2. The method of cutting an article utilizing a plurality of circumferentially spaced cutters, which includes the steps of: positioning the cutters adjacent the article; and subjecting the article to percussion blows of said cutters in response to sound waves transmitted to said cutters under conditions of resonance.

3. The method of cutting pipe with a cutter, which includes the steps of: positioning the cutter in contact with the pipe; rotating said cutter relative to the pipe; and varying the pressure of contact of said cutter with the pipe in response to sound waves.

4. The method of cutting an article with a cutter, which includes the steps of: positioning the cutter in contact with the article; rotating said cutter relative to the article; and varying the pressure of contact of said cutter with the pipe in response to sound waves of substantially sine form.

5. The method of cutting pipe utilizing a cutter member, which includes the steps of: positioning the cutter member adjacent the pipe; and reciprocating the cutter member longitudinally relative to the pipe to exert a planing action thereon in response to sound waves.

6. The method of cutting pipe utilizing a cutter member, which includes the steps of: positioning the cutter member adjacent the pipe; and reciprocating the cutter member radially and longitudinally relative to the pipe to exert a planing action thereon in response to sound waves.

7. The method of cutting pipe with a cutter, which includes the steps of: positioning the cutter in contact with the pipe; rotating said cutter relative to the pipe; generating sound waves; and varying the pressure of contact of said cutter with the pipe by transmitting said sound waves thereto under conditions of resonance.

8. The method of cutting pipe utilizing a cutter member, which includes the steps of: positioning the cutter member adjacent the pipe; generating sound waves of substantially sine form; and moving said cutter member circumferentially relative to said pipe while reciprocating said cutter member relative to said pipe in response to said sound waves transmitted to said cutter member through an elastic medium under conditions establishing a standing sound wave in the medium.

9. The method of cutting pipe utilizing a cutter member, which includes the steps of: positioning the cutter member adjacent the pipe; generating sound waves of substantially sine form; and reciprocating said cutter member radially and longitudinally relative to the pipe, whereby a planing action is exerted thereon, in response to said sound waves transmitted to said cutter member through an elastic medium under conditions establishing a standing sound wave in the medium.

10. The method of cutting pipe with a cutter in a well, which includes the steps of: lowering a cutter adjacent the pipe in the well; generating sound waves at the top of the well; transmitting said sound waves through an elastic medium substantially under conditions of resonance; and moving said cutter in cutting relationship relative to the pipe in response to said transmitted sound waves.

11. The method of cutting pipe with a cutter in a well, which includes the steps of: lowering a cutter in the well adjacent the pipe; generating sound waves at the top of the well; transmitting said sound waves through an elastic medium under conditions establishing a standing sound wave in said medium; and actuating said cutter radially and longitudinally relative to the pipe by said standing wave.

12. The method of removing pipe from a well utilizing an engaging member, which includes the steps of: lowering said member into the well adjacent the pipe; generating sound waves at the top of the well; transmitting said sound waves through an elastic medium in the well; and elevating the pipe in the well by vertical reciprocation of said member in engagement therewith in response to said transmitted sound waves.

13. The method of loosening pipe stuck in a well utilizing an engaging member adapted to move the pipe upwardly during its upward movement and to slide along the pipe during its downward movement, which includes the steps of: lowering said member into the well adjacent the pipe; generating sound waves; transmitting said sound waves through an elastic medium and said member to the pipe; and establishing resonance in the pipe below said member by varying the frequency of said sound waves generated.

14. The method of removing drill pipe from a well utilizing an engaging member and a cutting member, which includes the steps of: lowering said members into the well adjacent the pipe; generating sound waves; transmitting said sound waves through an elastic medium in the well; elevating the pipe in the well, when its upward movement is unobstructed, by vertical reciprocating of said engaging member in engagement therewith in response to said transmitted sound waves; and cutting the pipe in the well, only when its upward movement is obstructed, by movement of said cutting member relative to the pipe in response to said transmitted sound waves.

15. In apparatus for cutting pipe, the combination of: a plurality of cutter members adapted for circumferentially spaced contacts with the pipe and for cutting the pipe by movement relative thereto in response to sound waves; elastic means in sound wave-transmitting relationship with said cutter members; and means adapted for generating sound waves of sine form in said elastic means.

16. In apparatus for cutting pipe in a well, the combination of: a plurality of cutter members adapted for circumferentially spaced contacts with the pipe in a well and for cutting the pipe by movement relative thereto in response to sound waves; elastic means in sound wave-transmitting relationship with said cutter members; and means at the top of the well adapted for generating sound waves in said elastic means of such frequency as to establish a stationary sound wave in said elastic means.

17. In a cutting apparatus, the combination of: cutter means adapted for movement into contact with and relative to the article to be cut; control means adapted for actuating said cutter means by relative movement of said control means and said cutter means; elastic means in sound wave transmitting relationship with said means; and means adapted for generating sound waves in said elastic medium inducing relative movement of said control means and said cutter means.

18. In a cutting apparatus, the combination of: cutter means adapted for movement into contact with and relative to the article to be cut; control means adapted for actuating said cutter means by relative movement of said control means and said cutter means; resilient means resisting relative movement of said control means and said cutter means; elastic means in sound wave-transmitting relationship with said means; and means adapted for generating sound waves in said elastic medium under conditions establishing a stationary sound wave in said elastic means inducing relative movement of said control means and said cutter means.

19. In apparatus for removing pipe from a well, the combination of: a tool body adapted to be lowered in the well adjacent the pipe; cutter means associated with said body and adapted for movement relative to the pipe and in contact therewith; control means adapted for actuating said cutter means by relative movement of said control means and said cutter means; resilient means connecting said control means and said body and resisting relative movement of said control means and said cutter means; pipe engaging means associated with said body and adapted for lifting the pipe by engagement therewith during upward movement of said body and for sliding along the pipe during downward movement of said body; elastic means in sound wave-transmitting relationship with said body; and means adapted for generating in said elastic means sound waves of a frequency establishing a stationary sound wave in said elastic means, whereby said cutter means is actuated and said body is reciprocated vertically.

20. The method of cutting an object with a cutter, which includes the steps of: positioning the cutter adjacent the surface of such object; and, during relative movement of said cutter and such surface, varying the presure of contact of said cutter with such object along the path to be cut in response to sound waves.

21. The method of cutting an object utilizing a cutter member, which includes the steps of: positioning the cutter member adjacent the surface of such object; and, during relative movement of the cutter member and the object, reciprocating the cutter member toward and away from such surface along the path to be cut in response to sound waves.

22. Apparatus for cutting an object utilizing a cutter member, which includes in combination: means for mounting the cutter member adjacent the surface of such object for relative movement of the cutter member and the object along the path to be cut; means for relatively moving said cutter member and said object; and means for reciprocating the cutter member toward and away from such surface along the path to be cut in response to sound waves substantially of sine form.

23. The method of cutting an object with a cutter, which includes the steps of: positioning the cutter in contact with the object; generating sound waves; and, during relative movement of the cutter and the object, varying the pressure of contact of the cutter with the object along the path to be cut in response to said sound waves transmitted under conditions of substantial resonance.

24. The method of cutting an object with a cutter, which includes the steps of: positioning the cutter in contact with the object; moving the cutter relative to the object; generating sound waves of substantially sine form; and, during relative movement of the cutter and the object, varying the pressure of contact of the cutter with the object in response to said sound waves transmitted under conditions of substantial resonance.

25. The method of cutting a cylindrical member utilizing a cutter member, which includes the steps of: positioning the cutter member adjacent the member; and reciprocating the cutter member radially relative to the member to exert a cutting action thereon in response to sound waves.

26. In a cutting apparatus, the combination of: cutter means adapted for movement into contact with and relative to the surface of the article to be cut; inertia means adapted for actuating said cutter means; and sound wave generating means in sound wave transmitting relationship with said inertia means.

27. The method of loosening pipe stuck in a well utilizing a member so engaging the pipe as to urge it upwardly upon upward movement of the member, which includes the steps of: generating sound waves; transmitting said sound waves to such member and the pipe; and establishing a stationary sound wave in the pipe by varying the frequency of said sound waves generated.

28. The method of loosening pipe stuck in a well utilizing a member so engaging the pipe as to urge it upwardly upon upward movement of the member, which includes the steps of: generating sound waves; transmitting said sound waves to such member through an elastic medium; and establishing a stationary sound wave in the medium by varying the frequency of the sound waves generated.

29. The method of moving an object relative to material embracing it, utilizing a member so engaging the object as to urge it in one direction upon movement of the member in that direction, which includes the steps of: generating sound waves; transmitting said sound waves to such member through an elastic medium; and moving such member in said direction in response to such transmitted sound waves.

30. The method of cutting an object utilizing a plurality of cutters so related that their forces of contact against such object are opposed, which includes the steps of: positioning the cutters adjacent such object; generating sound waves; and substantially correspondingly varying the pressure of contact of the cutters with such object in response to said sound waves.

31. In a cutting apparatus, the combination of: a plurality of cutter means adapted for movement in pressural contact with an article to be cut in response to sound waves, said means being so disposed that a component of the pressure of contact of one of such means is opposed to a component of the pressure of contact of another of such means; and sound wave generating means in sound wave transmitting relationship with said cutter means.

32. In combination: cutter means adapted for cutting a surface by movement relative thereto in response to sound waves; elastic means in sound wave transmitting relationship with said cutter means; and means adapted for generating sound waves in said elastic means.

33. The method of cutting the surface of a member utilizing a cutter member, which includes the steps of: positioning the cutter member in proximity to such surface; and reciprocating the cutter member along and substantially parallel to such surface to exert a cutting action thereon in response to sound waves.

34. In combination: cutter means; means for mounting said cutter means for movement along a surface to be cut; elastic means operatively associated with said cutter means; and means for generating sound waves in said elastic means to move said cutter means along said surface.

35. In a cutting apparatus, the combination of: a body mounted for movement in a direction generally parallel to the surface to be cut; cutter means carried by said body to engage said surface in cutting relationship; and means for oscillating said body in said direction in response to sound waves, said last-named means including a sound wave generating means and an elastic means for transmitting said sound waves from said generating means to said body.

ALBERT G. BODINE, Jr.

CERTIFICATE OF CORRECTION.

Patent No. 2,304,793.  December 15, 1942.

ALBERT G. BODINE, JR.

It is hereby certified that error appears in the printed specification of the above numbered patent requiring correction as follows: Page 4, second column, line 29, for "tood" read --tool--; page 7, second column, line 24, claim 15, before "sine" insert --substantially--; and that the said Letters Patent should be read with this correction therein that the same may conform to the record of the case in the Patent Office.

Signed and sealed this 16th day of March, A. D. 1943.

(Seal)
Henry Van Arsdale,
Acting Commissioner of Patents.